United States Patent
Mendes et al.

(10) Patent No.: US 12,432,198 B1
(45) Date of Patent: Sep. 30, 2025

(54) POPULATING A PASSWORD MANAGER BASED ON A SCAN OF AN EMAIL ACCOUNT OF A USER

(71) Applicant: PrivacyHawk, Inc, Los Angeles, CA (US)

(72) Inventors: Aaron Mendes, San Diego, CA (US); Justin Wright, Los Angeles, CA (US)

(73) Assignee: PrivacyHawk, Inc., Los Angeles, CA (US)

( * ) Notice: Subject to any disclaimer, the term of this patent is extended or adjusted under 35 U.S.C. 154(b) by 0 days.

(21) Appl. No.: 18/736,282

(22) Filed: Jun. 6, 2024

(51) Int. Cl.
*H04L 9/40* (2022.01)

(52) U.S. Cl.
CPC .......... *H04L 63/083* (2013.01); *H04L 63/123* (2013.01)

(58) Field of Classification Search
CPC .............................. H04L 63/083; H04L 63/123
See application file for complete search history.

(56) References Cited

U.S. PATENT DOCUMENTS

| | | | | |
|---|---|---|---|---|
| 2007/0073817 A1* | 3/2007 | Gorty | ............... | G06F 21/335 709/225 |
| 2008/0256197 A1* | 10/2008 | Deshpande | ............. | H04L 51/00 709/206 |
| 2009/0138562 A1* | 5/2009 | Schmulen | ............... | H04L 51/08 709/206 |
| 2013/0024924 A1* | 1/2013 | Brady | ..................... | G06F 21/31 709/206 |
| 2013/0312075 A1* | 11/2013 | Nichols | ............... | H04L 63/0815 726/8 |
| 2017/0011214 A1* | 1/2017 | Cavanagh | ........... | H04L 63/0846 |
| 2022/0385648 A1* | 12/2022 | Keiter | ................... | H04L 63/083 |

OTHER PUBLICATIONS

Rostam: A Passwordless Web Single Sign-on Solution Mitigating Server Breaches and Integrating Credential Manager and Federated Identity Systems; Mahnamfar et al, Oct. 2023 (Year: 2023).*

* cited by examiner

*Primary Examiner* — Jahangir Kabir

(74) *Attorney, Agent, or Firm* — Muncy, Geissler, Olds & Lowe, P.C.

(57) ABSTRACT

Disclosed are techniques for populating a password manager. In an aspect, a processing system of a user device or a remote server scans an email account of a user of a user device to identify a set of service providers from which the email account of the user has received one or more emails, optionally displays, via a user interface of the user device, a list of the set of service providers, optionally receives, via the user interface of the user device, a selection of at least a subset of the set of service providers, and populates a password manager with login information for the user for each of a set of service provider accounts corresponding to at least the subset of the set of service providers.

20 Claims, 6 Drawing Sheets

POPULATING A PASSWORD MANAGER BASED ON A SCAN OF AN EMAIL ACCOUNT OF A USER

TECHNICAL FIELD

Aspects of the disclosure relate generally to ensuring the privacy of a user's personal information, and more specifically, to populating a password manager for the online accounts of a user based on a scan of an email account of the user.

BACKGROUND

With the ever-increasing use of the Internet to interact with different service providers (e.g., retailers, utility companies, financial institutions, social media applications, organizations, government entities, etc.), users are creating more and more online accounts. Each of these accounts generally requires the user to setup a username (e.g., the user's email or a unique character string) and password to login to their account. Due to the large number of accounts users may have, many users simply reuse the same password, rather than attempting to keep track of a different password for each account. As such, when a user's account is compromised (i.e., "hacked"), the user has to change their password for each of their many accounts.

To address this issue, password managers have been introduced. A password manager allows a user to create and securely store their own unique passwords for each of their accounts. Alternatively or additionally, the password manager itself may generate the passwords for the user's accounts. Thus, rather than having to remember each password, the user's different passwords are stored in the password manager (usually in an encrypted database). Then, when logging into one of the user's accounts, the user can access the password from the password manager or, in some cases, the password manager may auto-fill the user's username and password.

Password managers typically require a user to create and remember one "master" password to unlock and access all the information stored in the password manager. To keep the user's passwords and other login information safe, a password manager may require multi-factor authentication when opening the password manager, such as a one-time password/passcode (OTP) delivered via text message or authenticator application, biometric data (e.g., fingerprints, facial recognition), or the like.

Currently only about 17% of Internet users actually use a password manager, despite the benefit of being able to securely store different unique passwords for each user account and the reduced risk in the event of a data breach. One of the reasons users do not use a password manager may be that creating the entries for all of the users' accounts is a time-consuming process, insofar as a user needs to remember all the online accounts they may have and manually create a new entry in the password manager for each account. As such, it would be beneficial to simplify the process of populating a password manager.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method performed by a processing system includes scanning an email account of a user of a user device to identify a set of service providers from which the email account of the user has received one or more emails; optionally displaying, via a user interface of the user device, a list of the set of service providers; optionally receiving, via the user interface of the user device, a selection of at least a subset of the set of service providers; and populating a password manager with login information for the user for each of a set of service provider accounts corresponding to at least the subset of the set of service providers.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
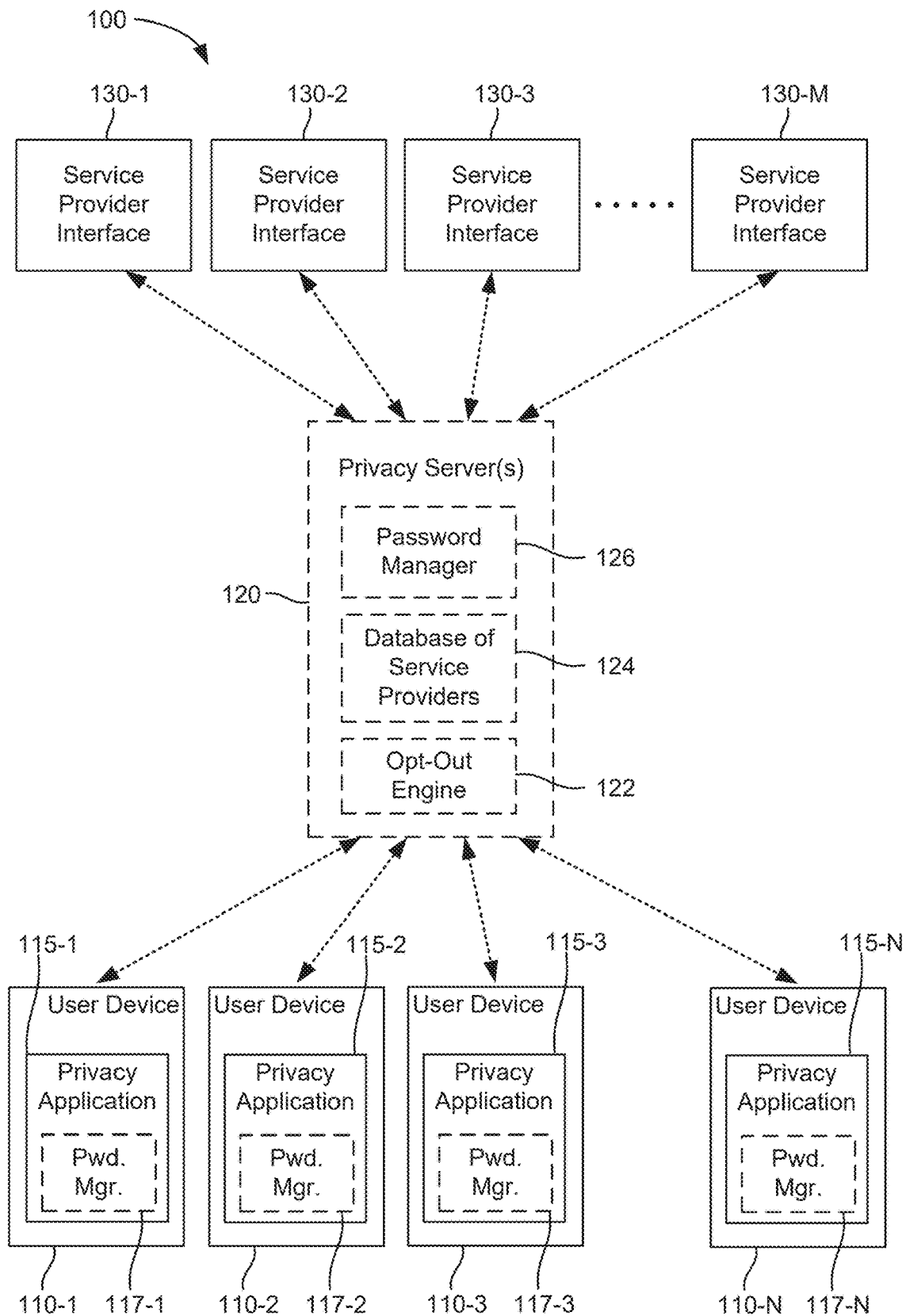
FIG. 1 illustrates an example system for implementing the opt-out and password manager techniques described herein.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

The present disclosure provides techniques to use an email scan of a user's inbox to identify service providers with which a user is likely to have an online account in order to automatically add those accounts to a password manager. In some cases, the email scan may be part of an opt-out procedure in which the user's email account is scanned for emails from service providers from which the user would like to opt-out of marketing emails.

The opt-out procedure, including the email scan that the password manager may utilize, will be described with reference to FIGS. 1 and 2. Specifically, FIG. 1 illustrates an example system 100 for implementing the opt-out and password manager procedures described herein, and FIG. 2 illustrates an example signaling flow 200 for the opt-out procedure described herein.

Figure 2:
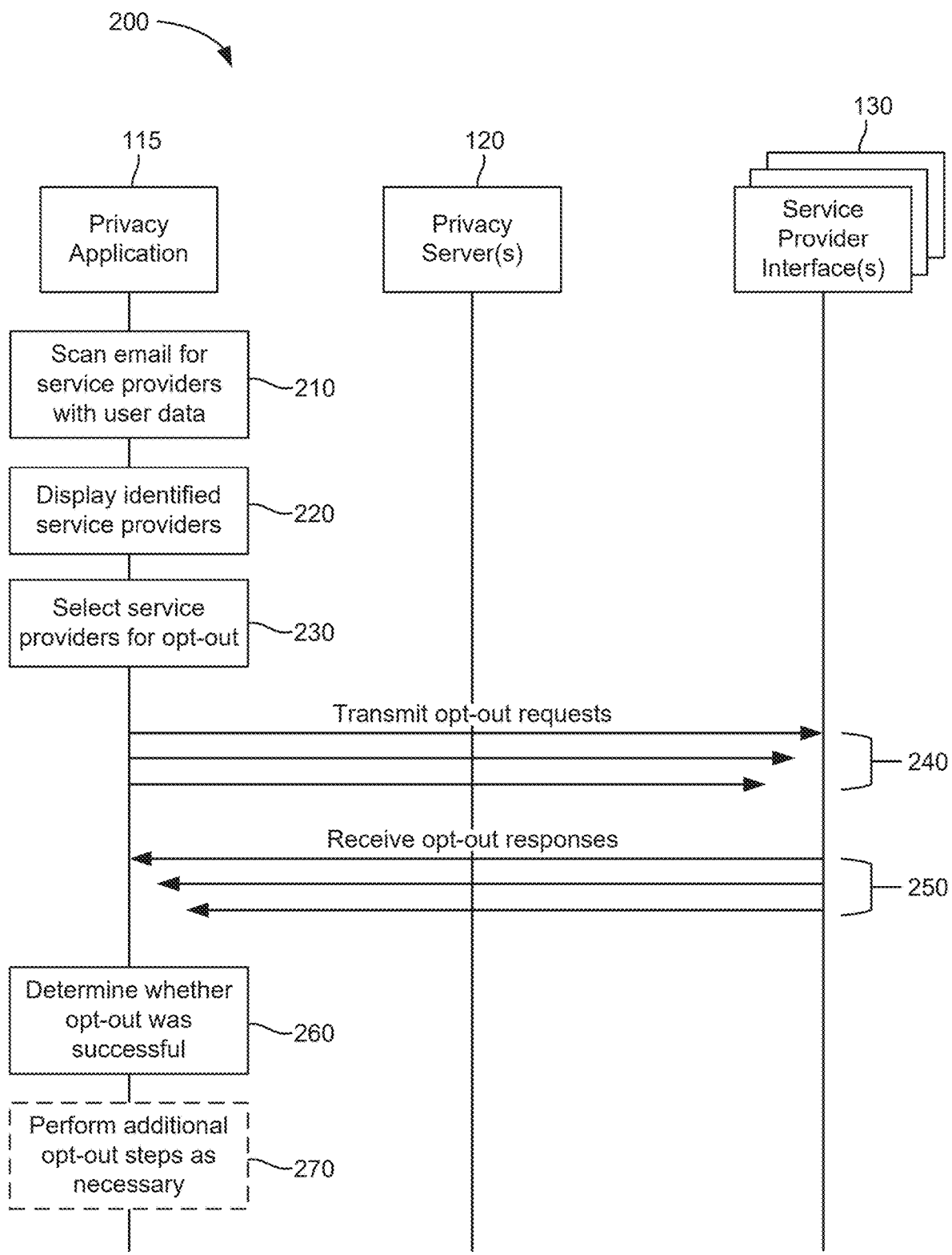
FIG. 2 illustrates an example signaling flow for the opt-out techniques described herein.

As shown in FIG. 1, a plurality of N user devices 110 (illustrated as user devices 110-1, 110-2, 110-3, . . . 110-N) each have a privacy application 115 installed thereon (illustrated as privacy applications 115-1, 115-2, 115-3, . . . 115-N). A user device 110 may be a smartphone, a tablet computer, a laptop computer, a desktop computer, or the like. The N user devices 110 may optionally be in communication with a privacy server 120 (or a group of distributed privacy servers 120). The privacy server(s) 120 implement an opt-out engine 122 and store a database of service providers 124. The privacy server 120 is in communication with a plurality of M service providers service providers (e.g., retailers, utility companies, financial institutions, social media applications, organizations, government entities, etc.) that may store users' first party data. More specifically, the privacy server 120 may be in communication with the service providers' interfaces, which may be the service providers' Internet or other network interface (e.g., website, webserver, etc.).

Many of the service providers with a user's first party data are likely to be found in the user's email. Thus, at stage 210 of FIG. 2, a privacy application 115 (optionally in communication with the opt-out engine 122) installed on a user device 110 scans the user's email for service providers that are likely to have the user's first party data. In some cases, this may be all the commercial/governmental/educational email accounts/domains from which the user has ever received email. In some cases, this may be all the sender email accounts/domains that match a service provider in the database of service providers 124. In this case, the privacy application 115 may securely provide a list of all commercial/governmental/educational email accounts/domains found in the user's email to the opt-out engine 122, which may in turn compare that list to the database of service providers 124. The opt-out engine 122 may then return to the privacy application 115 a list of service providers in the database of service providers 124 that match the list of service providers email accounts/domains received from the privacy application 115.

Based on the user's privacy preferences with respect to the user device 110 and/or email application, the user may need to grant the privacy application 115 permission to access the user's email application. In some cases, the user's email (or at least a portion of the user's email) may not be stored locally on the user device 110, but rather, on one or more remote email servers (not shown in FIG. 1 or 2). In those cases, the privacy application 115 may securely connect with the remote email server(s) to access the user's email.

Once the user's email has been scanned, at stage 220, the privacy application 115 displays a list of the identified service providers to the user via the user interface of the user device 110. The privacy application 115 may display a select button by each entry in the list of service providers identified at stage 210 to allow the user to select the corresponding service provider. The privacy application 115 may also recommend which service providers to select. For example, the privacy application 115 may display a list of "Recommended" service providers or highlight recommended service providers within the list of identified service providers. The recommendations may be based on information from the privacy server(s) 120.

At stage 230, the privacy application 115 selects the service providers to which to send opt-out requests. The selection may be based on user input. For example, the user may select to opt-out of all identified service providers, only recommended service providers, only service providers of a certain type (e.g., retailers, political organizations, etc.), or the like. The user may further indicate the type of opt-out desired, such as having all their first party data deleted, opting out of having their first party data shared with affiliates or other third parties, unsubscribing from promotional/marketing emails (often referred to as "spam"), requesting a copy of the data that the entity holds about the user ("right to know request"), or the like. Alternatively, the selection and type of opt-out may be selected automatically. For example, when initiating the email scan at stage 210, the user may set a preference to opt-out from allowing any service provider to share the user's personal information.

At stage 240, the privacy application 115 transmits opt-out requests to the selected service providers (optionally via the privacy server 120/opt-out engine 122). Some service providers handle opt-out requests by email (i.e., a user is expected to compose and send an opt-out request to the service provider by email) and other service providers handle opt-out requests by webform (i.e., the user is expected to fill out an online form requesting the opt-out). An opt-out request is generally more effective if it comes directly from the user. Accordingly, for email-based opt-out requests, the privacy application 115 composes and sends emails requesting the types of opt-outs for the respective service providers from the user's email account. For webform-based opt-outs, the privacy application 115 fills out and submits the applicable webform using any user data required by the webform (e.g., name, address, email, etc.).

At stage 250, the privacy application 115 receives responses to the opt-out requests sent at stage 240 (optionally via the privacy server 120/opt-out engine 122). The responses may be received immediately on submission of the opt-out request (which may occur in the case of a webform request) or at some later time (e.g., after the service provider has manually processed the opt-out request email or webform). The responses may indicate that the opt-out was successful (e.g., the service provider deleted and/or will not share/sell the user's personal information), that additional information or steps are necessary, that the user's data was not found (and therefore cannot be deleted), etc. If the opt-out response is not received immediately, the response will likely be received as an email at some later time.

At stage 260, based on the responses from the service providers received at stage 250, the privacy application 115 determines whether the respective opt-out requests were successful or if more information/steps are needed. In the case of a successful opt-out, the privacy application 115 may add that service provider to a list of successful opt-outs that may be displayed to the user on the user interface of the user device 110.

In the case that more information/steps are necessary to complete the opt-out, at stage 270, the privacy application 115 may determine what the information/steps are and perform them if possible. If not, the privacy application 115 notifies the user that there is additional information or additional steps needed to complete the opt-out. The user may then perform those steps or provide that information manually.

Note that a user may have multiple email accounts. As such, the procedure illustrated in FIG. 2 may be repeated for as many different email accounts the user wishes to process.

As will be appreciated, while FIGS. 1 and 2 illustrate one or more privacy servers 120, as will be appreciated, the techniques described herein may be performed entirely by the privacy application 115 locally on the user device 110. For example, the privacy application 115 may display all service providers identified within the user's email at stage 220, rather than comparing those service providers to the database of service providers 124 stored at the privacy server 120 at stage 210. Or the database of service providers 124 may be stored locally on the user device 110.

Alternatively, the privacy application 115 may simply be a communication gateway between the user device 110 (specifically the user's email application) and the opt-out engine 122, and the opt-out engine 122 may perform the substantive operations illustrated in FIG. 2. For example, at stage 210, the privacy application 115 may scan the user device 110 for any locally stored emails and send a list of identified service provider domains to the opt-out engine 122. The opt-out engine 122 may scan the user's emails stored on one or more remote email servers and compile a list of identified service providers based on the list received from the privacy application 115 (if any) and its own scan. At stage 220, the opt-out engine 122 may provide the list of identified service providers to the privacy application 115, which may then display the list on the user interface of the user device 110.

Similarly, at stage 230, the privacy application 115 may provide the user selections to the opt-out engine 122, which may then send the opt-out requests to the service providers at stage 240 and receive the responses at stage 250. The opt-out engine 122 may further perform stages 260 and 270.

As yet another alternative, the privacy application 115 may not be necessary at all, and the user may access the opt-out engine 122 via an Internet browser rather than the privacy application 115. In this case, the opt-out engine 122 would perform the operations illustrated in FIG. 2 and interact with the user of the user device 110 as needed (e.g., at stages 220 and 230) via the Internet browser (e.g., an online webform).

Figure 3:
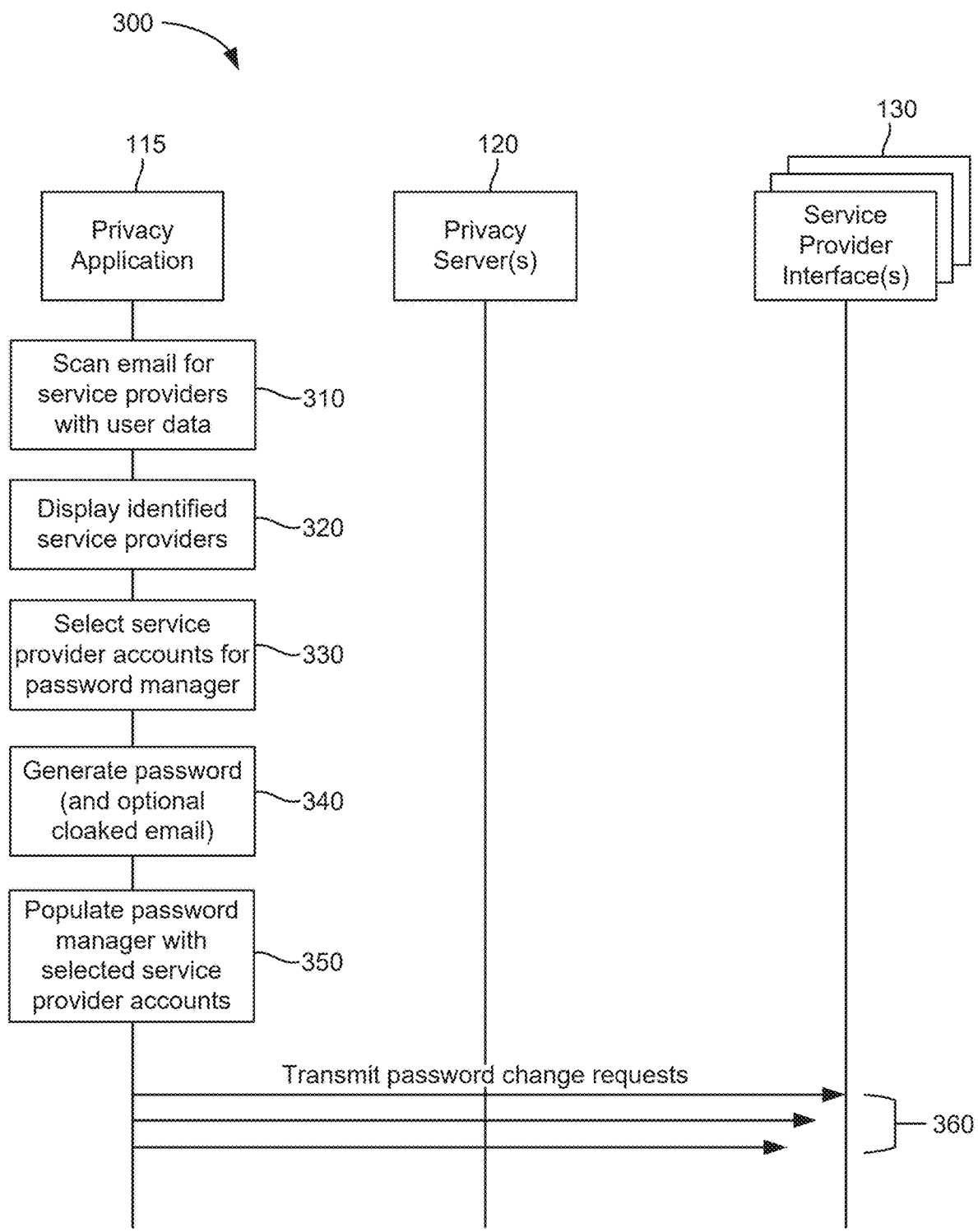
FIG. 3 illustrates an example signaling flow for the password manager techniques described herein.

The password manager population is now described with reference to FIGS. 1 and 3. As noted above, FIG. 1 illustrates an example system 100 for implementing the password manager techniques described herein. FIG. 3 illustrates an example signaling flow 300 for the password manager techniques described herein.

As shown in FIG. 1, the privacy applications 115 may each include a local password manager 117 (illustrated as password managers 117-1, 117-2, 117-3, . . . 117-N). Alternatively, the privacy server(s) 120 may implement a remote password manager 126 for each of the user devices 110. In either case, a password manager 117 or the password manager 126 securely stores the login information (e.g., username and password) for the service provider accounts of the user of the corresponding user device 110.

At stage 310 of FIG. 3, the privacy application 115 installed on a user device 110 scans the user's email account for service providers with which the user of the user device 110 is likely to have an account. This email scan may be the same as the scan at stage 210 of FIG. 2. In some cases, the service providers with which the user is likely to have an account may be all the commercial, governmental, educational, etc. email accounts/domains from which the user has ever received email. In some cases, the service providers with which the user is likely to have an account may be all the sender email accounts/domains that match a service provider in the database of service providers 124. In this case, the privacy application 115 may securely provide a list of all commercial, governmental, educational, etc. email accounts/domains found in the user's email to the privacy server(s) 120, which may in turn compare that list to the database of service providers 124. The privacy server(s) 120 may then return to the privacy application 115 a list of service providers in the database of service providers 124 that match the list of service provider email accounts/domains received from the privacy application 115.

Based on the user's privacy preferences with respect to the user device 110 and/or email application, the user may need to grant the privacy application 115 permission to access the user's email application. In some cases, the user's email (or at least a portion of the user's email) may not be stored locally on the user device 110, but rather, on one or more remote email servers (not shown in FIG. 1). In those cases, the privacy application 115 may securely connect (establish a secure connection) with the remote email server(s) to access the user's email.

Once the user's email account has been scanned, at stage 320, the privacy application 115 displays a list of the identified service providers to the user via the user interface of the user device 110. The privacy application 115 may display a select button by each entry in the list of service providers identified at stage 310 to allow the user to select the corresponding service provider.

At stage 330, the privacy application 115 receives selections (from the user of the user device 110) of the service providers displayed at stage 320. The selected service providers are service providers with which the user has an online account and would like to manage the login information for that account using the local password manager 117 or the remote password manager 126.

At stage 340, the privacy application 115 may generate a password for each selected service provider account. In some cases, for some (or all) service providers selected at stage 330, the user may generate the password, in which case, stage 340 is skipped for those service providers. In some cases, the privacy application 115 may also, if requested by the user of the user device 110, generate a "cloaked" email address for a selected service provider account. A cloaked email is an email address that simply forwards any email directed to the cloaked email address to the user's actual email address without revealing the user's actual email address. The user may indicate that he or she would like a cloaked email address for a particular service provider account when selecting the service provider accounts to include in the password manager 117/126 at stage 330. For example, the privacy application 115 may display a checkbox by each service provider displayed at stage 320 indicating whether a cloaked email address should be generated for that service provider.

In some cases, the privacy application 115 may also, if requested by the user of the user device 110, generate a non-email address username (or simply "non-email username") for a selected service provider account. The non-email username may be related to the user in some way (e.g., "JohnSmith123") or may be a random sequence of letters, numbers, and special characters (e.g., "ajg#67KRB_653b2"). The user may indicate that he or she would like a non-email username for a particular service provider account when selecting the service provider accounts to include in the password manager 117/126 at stage 330. For example, the privacy application 115 may display a checkbox by each service provider displayed at stage 320 indicating whether a non-email username should be generated for that service provider. As will be appreciated, whether the user requests a cloaked email address or a non-email username may depend on whether the service provider account permits the user to update their email or non-email username.

At stage 350, the privacy application 115 populates (i.e., creates entries in) the password manager 117/126 with the usernames and passwords from stage 340. Each entry may include the name of the service provider account (e.g., the name of the service provider or a user-generated nickname for the account), an Internet address of the service provider and/or the login page for the service provider, the user's username for that account, and the user's password for that account. In some cases, where the username for a particular service provider account is not the user's email address and the user has not requested to generate a new username (e.g., a cloaked email or a non-email username), the privacy application 115 may prompt the user for the username in order to store it in the password manager 117/126. The prompt may be a text box displayed with each service provider account displayed at stage 320 that allows the user to enter a non-email username for the particular service provider account.

In the case where the remote password manager 126 stores the user's login information, there should be a secure (e.g., encrypted) connection between the user device 110/privacy application 115 and the privacy server(s) 120/remote password manager 126. This ensures the security of the passwords being generated locally by the privacy application 115 and stored at the remote password manager 126. Likewise, it ensures the security of the passwords when being retrieved from the remote password manager 126 for a subsequent login to a given service provider account.

To further streamline the process of setting up the password manager 117/126, the privacy application 115 may, at stage 360, transmit change password requests to the service providers selected at stage 330. For example, the privacy application 115 may display a link to the change password page of the service provider's website, which may then open in a separate application on the user device 110 (e.g., a web browser or a service provider-dedicated application). Alternatively, the privacy application 115 may be able to open the change password page for the service provider within the privacy application 115. In either case, the user would be prompted for their current login information (i.e., current username and password), but would then be able to enter the new password generated by the privacy application 115, as well as the cloaked email or non-email username (if generated).

In some cases, rather than permit the user to select certain service providers at stage 330, the privacy application 115 may instead populate the password manager 117/126 at stage 350 with all service providers returned at stage 310. The user may then add additional service providers, remove service providers, or both. In this case, stage 340 would be performed after stage 350. In addition, in this case, the identified service providers may or may not be displayed at stage 320, as they will be displayed in the populated password manager 117/126.

In some cases, rather than the privacy application 115 run locally on the user device 110, the privacy application 115 may run remotely on the privacy server(s) 120 (not shown in FIG. 1). In this case, the user may access the privacy application 115 via a website hosted by the privacy server(s) 120.

Some users have multiple email accounts. As such, the signaling flow 300 may be repeated for each email account of the user that may be associated with an online account of the user, as desired by the user. In such cases, there may be separate password managers for each email account, or a single password manager for all of the user's email accounts. In the latter case, stages 310 to 330 would be performed for each email account and then stages 340 to 360 would be performed.

Figure 4:
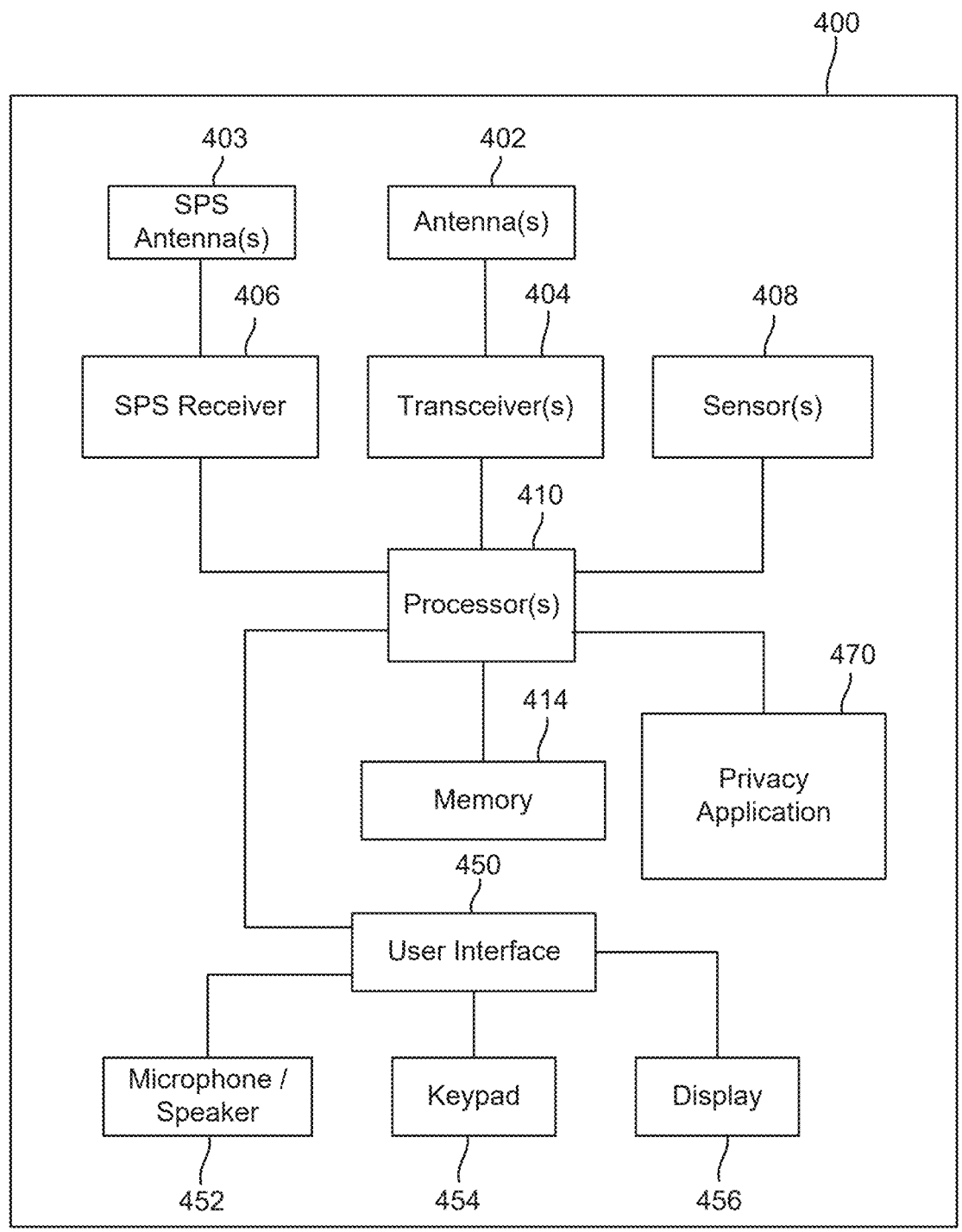
FIG. 4 is a block diagram illustrating various components of an example user device, according to aspects of the disclosure.

FIG. 4 is a block diagram illustrating various components of an example user device 400, according to aspects of the disclosure. In an aspect, the user device may correspond to any of the user devices described herein, such as user device 110 in FIG. 1. As a specific example, the user device 400 may be a smartphone, a tablet computer, a laptop computer, a desktop computer, or the like.

For the sake of simplicity, the various features and functions illustrated in the block diagram of FIG. 4 are connected together using a common data bus that is meant to represent that these various features and functions are operatively coupled together. Those skilled in the art will recognize that other connections, mechanisms, features, functions, or the like, may be provided and adapted as necessary to operatively couple and configure an actual user device. Further, it is also recognized that one or more of the features or functions illustrated in the example of FIG. 4 may be further subdivided, or two or more of the features or functions illustrated in FIG. 4 may be combined.

The user device 400 may include one or more transceivers 404 connected to one or more antennas 402 and providing means for communicating (e.g., means for transmitting, means for receiving, means for measuring, means for tuning, means for refraining from transmitting, etc.) with other network nodes, such as other user devices 110 and/or the privacy server(s) 120 via at least one designated radio access technology (RAT) (e.g., Wi-Fi, Long-Term Evolution (LTE), Fifth Generation New Radio (5G NR), etc.) over one or more wireless communication links. The one or more transceivers 404 may be variously configured for transmitting and encoding wireless signals (e.g., messages, indications, information, and so on), and, conversely, for receiving and decoding wireless signals (e.g., messages, indications, information, pilots, and so on) in accordance with the designated RAT. In an aspect, the one or more transceivers 404 and the antenna(s) 402 may form a (wireless) communication interface of the user device 400.

As used herein, a "transceiver" may include at least one transmitter and at least one receiver in an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antenna(s) 402), such as an antenna array. Similarly, a receiver may include or be coupled to a plurality of antennas (e.g., antenna(s) 402), such as an antenna array. In an aspect, the transmitter(s) and receiver(s) may share the same plurality of antennas (e.g., antenna(s) 402), such that the user device 400 can only receive or transmit at a given time, not both at the same time. In some cases, a transceiver may not provide both transmit and receive functionalities. For example, a low functionality receiver circuit may be employed in some designs to reduce costs when providing full communication is not necessary (e.g., a receiver chip or similar circuitry simply providing low-level sniffing).

The user device 400 may also include a satellite positioning system (SPS) receiver 406. The SPS receiver 406 may be connected to the one or more SPS antennas 403 and may provide means for receiving and/or measuring satellite signals. The SPS receiver 406 may comprise any suitable hardware and/or software for receiving and processing SPS signals, such as global positioning system (GPS) signals. The SPS receiver 406 requests information and operations as appropriate from the other systems, and performs the calculations necessary to determine the user device's 400 position using measurements obtained by any suitable SPS algorithm.

One or more sensors 408 may be coupled to one or more processors 410 and may provide means for sensing or detecting information related to the state and/or environment of the user device 400, such as speed, heading (e.g., compass heading), headlight status, gas mileage, etc. By way of example, the one or more sensors 408 may include a speedometer, a tachometer, an accelerometer (e.g., a microelectromechanical systems (MEMS) device), a gyroscope, a geomagnetic sensor (e.g., a compass), an altimeter (e.g., a barometric pressure altimeter), etc.

The one or more processors 410 may include one or more central processing units (CPUs), microprocessors, microcontrollers, ASICs, processing cores, DSPs, field-programmable gate arrays (FPGAs), or the like that provide processing functions, as well as other calculation and control functionality. The one or more processors 410 may therefore provide means for processing, such as means for determining, means for calculating, means for receiving, means for transmitting, means for indicating, etc. The one or more processors 410 may include any form of logic suitable for performing, or causing the components of the user device 400 to perform, at least the techniques described herein.

The one or more processors 410 may also be coupled to a memory 414 providing means for storing (including means for retrieving, means for maintaining, etc.) data and software instructions for executing programmed functionality within the user device 400. The memory 414 may be on-board the one or more processors 410 (e.g., within the same integrated circuit (IC) package), and/or the memory 414 may be external to the one or more processors 410 and functionally coupled over a data bus.

The user device 400 may include a user interface 450 that provides any suitable interface systems, such as a microphone/speaker 452, keypad 454, and display 456 that allow user interaction with the user device 400. The microphone/speaker 452 may provide for voice communication services with the user device 400. The keypad 454 may comprise any suitable buttons for user input to the user device 400. The display 456 may comprise any suitable display, such as, for example, a backlit liquid crystal display (LCD), and may further include a touch screen display for additional user input modes. The user interface 450 may therefore be a means for providing indications (e.g., audible and/or visual indications) to a user and/or for receiving user input (e.g., via user actuation of a sensing device such a keypad, a touch screen, a microphone, and so on).

In an aspect, the user device 400 may include a privacy application 470 (which may correspond to privacy application 115) coupled to the one or more processors 410. The privacy application 470 may be a hardware, software, or firmware component that, when executed, causes the user device 400 to perform the operations described herein. For example, the privacy application 470 may be a software module stored in memory 414 and executable by the one or more processors 410. As another example, the privacy application 470 may be a hardware circuit (e.g., an ASIC, a field-programmable gate array (FPGA), etc.) within the user device 400.

Figure 5:
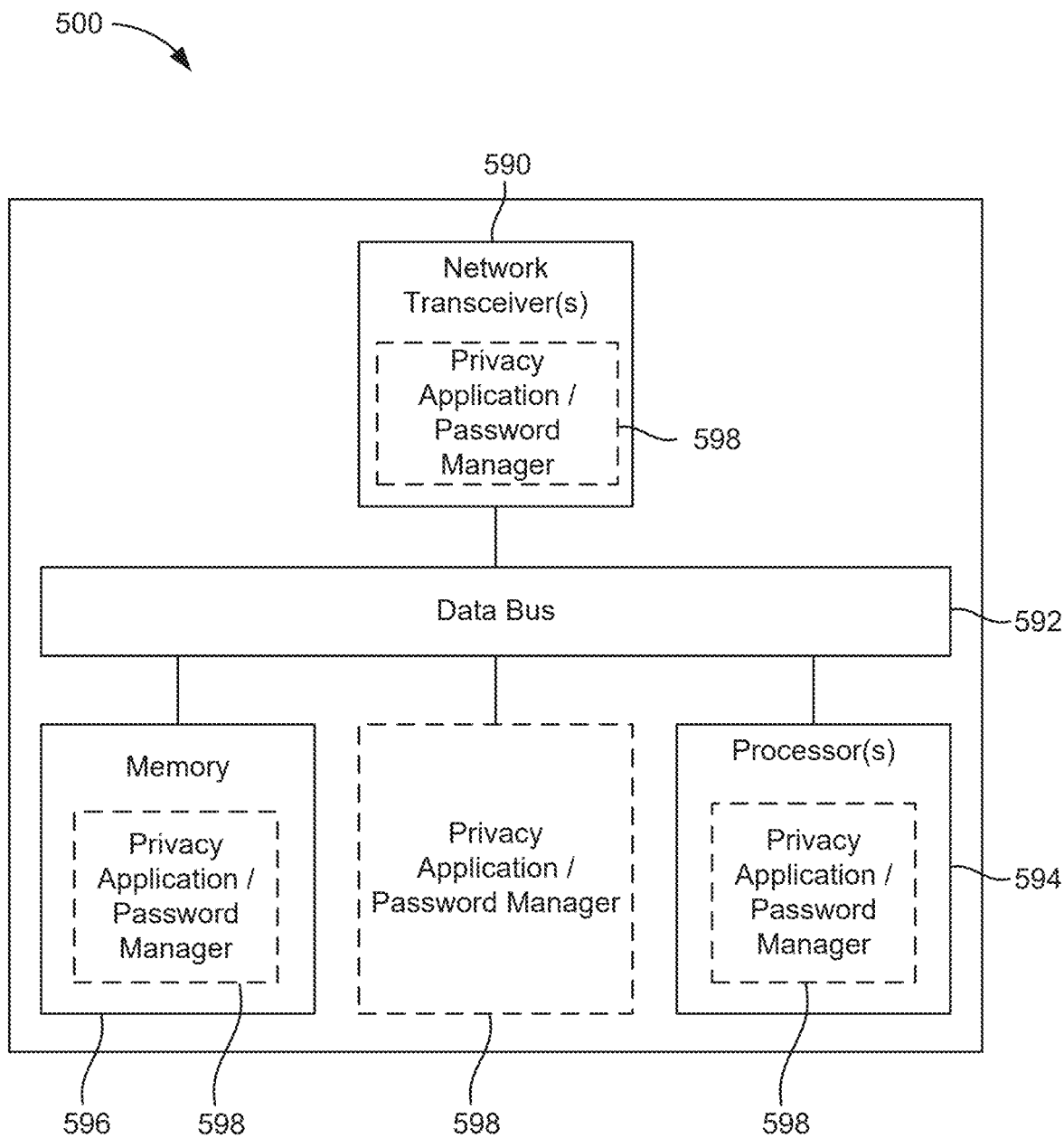
FIG. 5 is a block diagram illustrating various components of an example privacy server, according to aspects of the disclosure.

FIG. 5 illustrates several example components (represented by corresponding blocks) that may be incorporated into a privacy server 500 (which may correspond to a privacy server 120) to support the operations described herein.

The privacy server 500 may include one or more network transceivers 590 providing means for communicating (e.g., means for transmitting, means for receiving, etc.) with other network entities (e.g., other privacy servers 500/120). For example, the privacy server 500 may employ the one or more network transceivers 590 to communicate with other privacy servers 500/120 over one or more wired or wireless network interfaces.

The privacy server 500 may also include other components that may be used in conjunction with the operations as disclosed herein. The privacy server 500 may include one or more processors 594 for providing functionality relating to, for example, password manager procedures, as described herein, and for providing other processing functionality. The one or more processors 594 may therefore provide means for processing, such as means for determining, means for calculating, means for receiving, means for transmitting, means for indicating, etc. In an aspect, the one or more processors 594 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The privacy server 500 may include memory circuitry implementing one or more memories 596 (e.g., each including a memory device) for maintaining information (e.g., the database of service providers 124, the password manager 126, and so on). The one or more memories 596 may therefore provide means for storing, means for retrieving, means for maintaining, etc. In some cases, the privacy server 500 may include a privacy application and/or password manager 598 (which may correspond to the privacy application 115 and/or the password manager 126, respectively). The privacy application and/or password manager 598 may be hardware circuits that are part of or coupled to the one or more processors 594 that, when executed, cause the privacy server 500 to perform the functionality described herein. In other aspects, the privacy application and/or password manager 598 may be external to the one or more processors 594 (e.g., part of a modem processing system, integrated with another processing system, etc.). Alternatively, the privacy application and/or password manager 598 may be a memory module stored in the one or more memories 596 that, when executed by the one or more processors 594 (or a modem processing system, another processing system, etc.), cause the privacy server 500 to perform the functionality described herein. FIG. 5 illustrates possible locations of the privacy application and/or password manager 598, which may be, for example, part of the one or more network transceivers 590, the one or more memories 596, the one or more processors 594, or any combination thereof, or may be a standalone component.

The various components of the privacy server 500 may be communicatively coupled to each other over a data bus 592. In an aspect, the data bus 592 may form, or be part of, a communication interface of the privacy server 500. For example, where different logical entities are embodied in the same device, the data bus 592 may provide communication between them.

The components of FIG. 5 may be implemented in various ways. In some cases, the components of FIG. 5 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 590 to 598 may be implemented by processor and memory component(s) of the privacy server 500 (e.g., by execution of appropriate code and/or by appropriate configuration of processor components). For simplicity, various operations, acts, and/or functions are described herein as being performed "by a privacy server." However, as will be appreciated, such operations, acts, and/or functions may actually be performed by specific components or combinations of components of the privacy server 500, such as the one or more processors 594, the one or more network transceivers 590, the one or more memories 596, the privacy application and/or password manager 598, etc.

Figure 6:
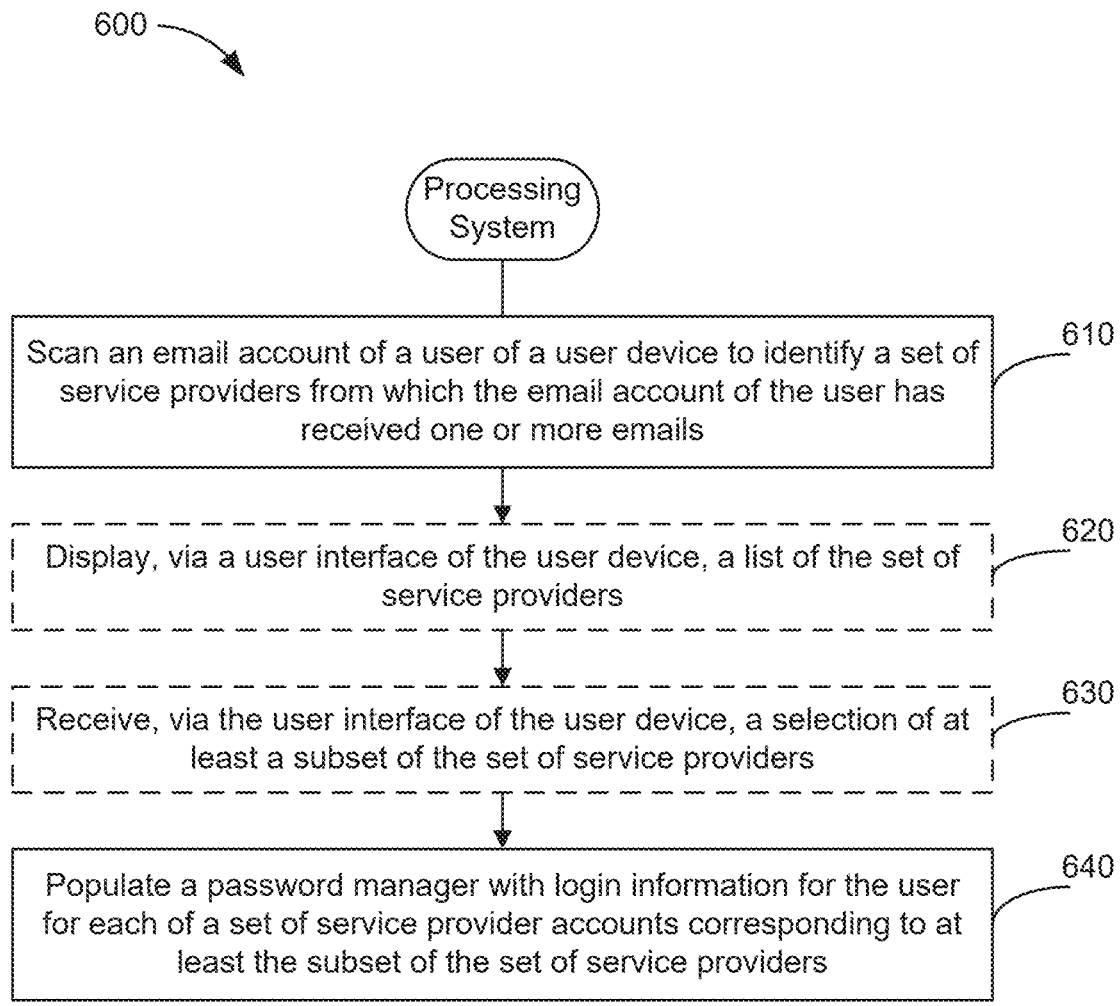
FIG. 6 illustrates an example method of populating a password manager, according to aspects of the disclosure.

FIG. 6 illustrates an example method 600 of populating a password manager, according to aspects of the disclosure. In an aspect, method 600 may be performed by a processing system (e.g., the one or more processors 410 of the user device 400 or the one or more processors 594 of the privacy server 500, optionally in combination with other components of the user device 400 or the privacy server 500).

At operation 610, the processing system scans an email account of a user of a user device to identify a set of service providers from which the email account of the user has received one or more emails, as at stage 310 of FIG. 3.

In an aspect, where the processing system is a user device 400, operation 610 may be performed by the one or more transceivers 404, the one or more processors 410, memory 414, the user interface 450, and/or privacy application 470, any or all of which may be considered means for performing this operation.

In an aspect, where the processing system is a privacy server 500, operation 610 may be performed the one or more network transceivers 590, the one or more processors 594, memory 596, and/or privacy application/password manager 598, any or all of which may be considered means for performing this operation.

At operation 620, the processing system optionally displays, via a user interface of the user device, a list of the set of service providers, as at stage 320 of FIG. 3.

In an aspect, where the processing system is a user device 400, operation 620 may be performed by the one or more transceivers 404, the one or more processors 410, memory 414, the user interface 450, and/or privacy application 470, any or all of which may be considered means for performing this operation.

In an aspect, where the processing system is a privacy server 500, operation 620 may be performed the one or more network transceivers 590, the one or more processors 594, memory 596, and/or privacy application/password manager 598, any or all of which may be considered means for performing this operation.

At operation 630, the processing system optionally receives, via the user interface of the user device, a selection of at least a subset of the set of service providers, as at stage 330 of FIG. 3.

In an aspect, where the processing system is a user device 400, operation 630 may be performed by the one or more transceivers 404, the one or more processors 410, memory 414, the user interface 450, and/or privacy application 470, any or all of which may be considered means for performing this operation.

In an aspect, where the processing system is a privacy server 500, operation 630 may be performed the one or more network transceivers 590, the one or more processors 594, memory 596, and/or privacy application/password manager 598, any or all of which may be considered means for performing this operation.

At operation 640, the processing system populates (i.e., creates entries in) a password manager with login information for the user for each of a set of service provider accounts corresponding to at least the subset of the set of service providers, as at stage 350 of FIG. 3.

In an aspect, where the processing system is a user device 400, operation 640 may be performed by the one or more transceivers 404, the one or more processors 410, memory 414, the user interface 450, and/or privacy application 470, any or all of which may be considered means for performing this operation.

In an aspect, where the processing system is a privacy server 500, operation 640 may be performed the one or more network transceivers 590, the one or more processors 594, memory 596, and/or privacy application/password manager 598, any or all of which may be considered means for performing this operation.

In some cases, the method 600 may further include (not shown) generating a password for one or more service provider accounts of the set of service provider accounts, as at stage 340 of FIG. 3, where the login information for the user for the corresponding service provider account includes the password.

In some cases, the method 600 may further include (not shown) generating cloaked email addresses for one or more service provider accounts of the set of service provider accounts, as optionally at stage 340 of FIG. 3, where the login information for the user for the corresponding service provider accounts includes the cloaked email addresses.

In some cases, the method 600 may further include (not shown) receiving, via the user interface of the user device, an indication to generate the cloaked email addresses for the one or more service provider accounts, as optionally at stage 330 of FIG. 3.

In some cases, the method 600 may further include (not shown) generating non-email address usernames for one or more service provider accounts of the set of service provider accounts, as optionally at stage 340 of FIG. 3, where the login information for the user for the corresponding service provider accounts includes the non-email address usernames.

In some cases, the method 600 may further include (not shown) receiving, via the user interface of the user device, an indication to generate the non-email address usernames for the one or more service provider accounts, as optionally at stage 330 of FIG. 3.

In some cases, the method 600 may further include (not shown) displaying, via the user interface of the user device, links to change password pages of websites of at least the subset of the set of service providers.

In some cases, the method 600 may further include (not shown) transmitting, via the change password pages of the websites of at least the subset of the set of service providers, change password requests to at least the subset of the set of service providers, as at stage 360 of FIG. 3.

In some cases, the set of service providers from which the email account of the user has received one or more emails may include (1) all service providers identified in the email account of the user, or (2) only service providers identified in the email account of the user and present in a database of service providers.

In some cases, populating the password manager may include (1) transmitting, to a remote server, via a communication interface coupled to the processing system, the login information for the user for each of the set of service provider accounts (e.g., where the processing system is a component of the user device), or (2) storing, in a local memory coupled to the processing system, the login information for the user for each of the set of service provider accounts (e.g., where the processing system is a component of the user device or the privacy server).

In some cases, the method 600 may further include (not shown) connecting (or establishing a connection), via a communication interface coupled to the processing system, to one or more email servers hosting the email account of the user. In this case, the email account of the user is scanned at operation 610 on the one or more email servers via the communication interface.

In some cases, the password manager may be stored (1) in a memory of the user device, or (2) in a memory of a remote server (e.g., privacy server 120/500).

In some cases, the processing system may be a component of (1) the user device (e.g., user device 110/400), or a remote server (e.g., privacy server 120/500).

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method performed by a processing system, comprising: scanning an email account of a user of a user device to identify a set of service providers from which the email account of the user has received one or more emails; receiving, via the user interface of the user device, a selection of at least a subset of the set of service providers; and populating a password manager with login information for the user for each of a set of service provider accounts corresponding to at least a subset of the set of service providers.

Clause 2. The method of clause 1, further comprising: generating a password for one or more service provider accounts of the set of service provider accounts, wherein the login information for the user for the corresponding service provider account includes the password.

Clause 3. The method of any of clauses 1 to 2, further comprising: generating cloaked email addresses for one or more service provider accounts of the set of service provider accounts, wherein the login information for the user for the corresponding service provider accounts includes the cloaked email addresses.

Clause 4. The method of clause 3, further comprising: receiving, via a user interface of the user device, an indication to generate the cloaked email addresses for the one or more service provider accounts.

Clause 5. The method of any of clauses 1 to 4, further comprising: generating non-email address usernames for one or more service provider accounts of the set of service provider accounts, wherein the login information for the user for the corresponding service provider accounts includes the non-email address usernames.

Clause 6. The method of clause 5, further comprising: receiving, via a user interface of the user device, an indication to generate the non-email address usernames for the one or more service provider accounts.

Clause 7. The method of any of clauses 1 to 6, further comprising: displaying, via a user interface of the user device, a list of the set of service providers; and receiving, via the user interface of the user device, a selection of at least a subset of the set of service providers.

Clause 8. The method of any of clauses 1 to 7, further comprising: displaying, via a user interface of the user device, links to change password pages of websites of at least the subset of the set of service providers.

Clause 9. The method of clause 8, further comprising: transmitting, via the change password pages of the websites of at least the subset of the set of service providers, change password requests to at least the subset of the set of service providers.

Clause 10. The method of any of clauses 1 to 9, wherein the set of service providers from which the email account of the user has received one or more emails includes: all service providers identified in the email account of the user, or only service providers identified in the email account of the user and present in a database of service providers.

Clause 11. The method of any of clauses 1 to 10, wherein populating the password manager comprises: transmitting, to a remote server, via a communication interface coupled to the processing system, the login information for the user for each of the set of service provider accounts; or storing, in a local memory coupled to the processing system, the login information for the user for each of the set of service provider accounts.

Clause 12. The method of any of clauses 1 to 11, further comprising: connecting, via a communication interface coupled to the processing system, to one or more email servers hosting the email account of the user, wherein the email account of the user is scanned on the one or more email servers via the communication interface.

Clause 13. The method of any of clauses 1 to 12, wherein the password manager is stored: in a memory of the user device, or in a memory of a remote server.

Clause 14. The method of any of clauses 1 to 13, wherein the processing system is a component of: the user device, or a remote server.

Clause 15. An apparatus, comprising: one or more memories; one or more transceivers; and one or more processors communicatively coupled to the one or more memories and the one or more transceivers, the one or more processors, either alone or in combination, configured to: scan an email account of a user of a user device to identify a set of service providers from which the email account of the user has received one or more emails; and populate a password manager with login information for the user for each of a set of service provider accounts corresponding to at least a subset of the set of service providers.

Clause 16. The apparatus of clause 15, wherein the one or more processors, either alone or in combination, are further configured to: generate a password for one or more service provider accounts of the set of service provider accounts, wherein the login information for the user for the corresponding service provider account includes the password.

Clause 17. The apparatus of any of clauses 15 to 16, wherein the one or more processors, either alone or in combination, are further configured to: generate cloaked email addresses for one or more service provider accounts of the set of service provider accounts, wherein the login information for the user for the corresponding service provider accounts includes the cloaked email addresses.

Clause 18. The apparatus of clause 17, wherein the one or more processors, either alone or in combination, are further configured to: receive, via a user interface of the user device, an indication to generate the cloaked email addresses for the one or more service provider accounts.

Clause 19. The apparatus of any of clauses 15 to 18, wherein the one or more processors, either alone or in combination, are further configured to: generate non-email address usernames for one or more service provider accounts of the set of service provider accounts, wherein the login information for the user for the corresponding service provider accounts includes the non-email address usernames.

Clause 20. The apparatus of clause 19, wherein the one or more processors, either alone or in combination, are further configured to: receive, via a user interface of the user device, an indication to generate the non-email address usernames for the one or more service provider accounts.

Clause 21. The apparatus of any of clauses 15 to 20, wherein the one or more processors, either alone or in combination, are further configured to: display, via a user interface of the user device, a list of the set of service providers; and receive, via the user interface of the user device, a selection of at least the subset of the set of service providers.

Clause 22. The apparatus of any of clauses 15 to 21, wherein the one or more processors, either alone or in combination, are further configured to: display, via a user interface of the user device, links to change password pages of websites of at least the subset of the set of service providers.

Clause 23. The apparatus of clause 22, wherein the one or more processors, either alone or in combination, are further configured to: transmit, via the change password pages of the websites of at least the subset of the set of service providers, change password requests to at least the subset of the set of service providers.

Clause 24. The apparatus of any of clauses 15 to 23, wherein the set of service providers from which the email account of the user has received one or more emails includes: all service providers identified in the email account of the user, or only service providers identified in the email account of the user and present in a database of service providers.

Clause 25. The apparatus of any of clauses 15 to 24, wherein the one or more processors configured to populate the password manager comprises the one or more processors, either alone or in combination, configured to: transmit, via the one or more transceivers, to a remote server, the login information for the user for each of the set of service provider accounts; or store, in the one or more memories, the login information for the user for each of the set of service provider accounts.

Clause 26. The apparatus of any of clauses 15 to 25, wherein the one or more processors, either alone or in combination, are further configured to: connect, via the one or more transceivers, to one or more email servers hosting the email account of the user, wherein the email account of the user is scanned on the one or more email servers via the one or more transceivers.

Clause 27. The apparatus of any of clauses 15 to 26, wherein the password manager is stored: in a memory of the user device, or in a memory of a remote server.

Clause 28. The apparatus of any of clauses 15 to 27, wherein the apparatus is, or is a component of: the user device, or a remote server.

Clause 29. An apparatus, comprising: means for scanning an email account of a user of a user device to identify a set of service providers from which the email account of the user has received one or more emails; and means for populating a password manager with login information for the user for each of a set of service provider accounts corresponding to at least a subset of the set of service providers.

Clause 30. The apparatus of clause 29, further comprising: means for generating a password for one or more service provider accounts of the set of service provider accounts, wherein the login information for the user for the corresponding service provider account includes the password.

Clause 31. The apparatus of any of clauses 29 to 30, further comprising: means for generating cloaked email addresses for one or more service provider accounts of the set of service provider accounts, wherein the login information for the user for the corresponding service provider accounts includes the cloaked email addresses.

Clause 32. The apparatus of clause 31, further comprising: means for receiving, via a user interface of the user device, an indication to generate the cloaked email addresses for the one or more service provider accounts.

Clause 33. The apparatus of any of clauses 29 to 32, further comprising: means for generating non-email address usernames for one or more service provider accounts of the set of service provider accounts, wherein the login information for the user for the corresponding service provider accounts includes the non-email address usernames.

Clause 34. The apparatus of clause 33, further comprising: means for receiving, via a user interface of the user device, an indication to generate the non-email address usernames for the one or more service provider accounts.

Clause 35. The apparatus of any of clauses 29 to 34, further comprising: means for displaying, via a user interface of the user device, a list of the set of service providers; and means for receiving, via the user interface of the user device, a selection of at least the subset of the set of service providers.

Clause 36. The apparatus of any of clauses 29 to 35, further comprising: means for displaying, via a user interface of the user device, links to change password pages of websites of at least the subset of the set of service providers.

Clause 37. The apparatus of clause 36, further comprising: means for transmitting, via the change password pages of the websites of at least the subset of the set of service providers, change password requests to at least the subset of the set of service providers.

Clause 38. The apparatus of any of clauses 29 to 37, wherein the set of service providers from which the email account of the user has received one or more emails includes: all service providers identified in the email account of the user, or only service providers identified in the email account of the user and present in a database of service providers.

Clause 39. The apparatus of any of clauses 29 to 38, wherein the means for populating the password manager comprises: means for transmitting, to a remote server, the login information for the user for each of the set of service provider accounts; or means for storing, in a local memory of the apparatus, the login information for the user for each of the set of service provider accounts.

Clause 40. The apparatus of any of clauses 29 to 39, further comprising: means for connecting, via a communication interface of the apparatus, to one or more email servers hosting the email account of the user, wherein the email account of the user is scanned on the one or more email servers via the communication interface.

Clause 41. The apparatus of any of clauses 29 to 40, wherein the password manager is stored: in a memory of the user device, or in a memory of a remote server.

Clause 42. The apparatus of any of clauses 29 to 41, wherein the apparatus is: the user device, or a remote server.

Clause 43. A non-transitory computer-readable medium storing computer-executable instructions that, when executed by a processing system, cause the processing system to: scan an email account of a user of a user device to identify a set of service providers from which the email account of the user has received one or more emails; and populate a password manager with login information for the user for each of a set of service provider accounts corresponding to at least a subset of the set of service providers.

Clause 44. The non-transitory computer-readable medium of clause 43, further comprising computer-executable instructions that, when executed by the processing system, cause the processing system to: generate a password for one or more service provider accounts of the set of service provider accounts, wherein the login information for the user for the corresponding service provider account includes the password.

Clause 45. The non-transitory computer-readable medium of any of clauses 43 to 44, further comprising computer-executable instructions that, when executed by the processing system, cause the processing system to: generate cloaked email addresses for one or more service provider accounts of the set of service provider accounts, wherein the login information for the user for the corresponding service provider accounts includes the cloaked email addresses.

Clause 46. The non-transitory computer-readable medium of clause 45, further comprising computer-executable instructions that, when executed by the processing system, cause the processing system to: receive, via a user interface of the user device, an indication to generate the cloaked email addresses for the one or more service provider accounts.

Clause 47. The non-transitory computer-readable medium of any of clauses 43 to 46, further comprising computer-executable instructions that, when executed by the processing system, cause the processing system to: generate non-email address usernames for one or more service provider accounts of the set of service provider accounts, wherein the login information for the user for the corresponding service provider accounts includes the non-email address usernames.

Clause 48. The non-transitory computer-readable medium of clause 47, further comprising computer-executable instructions that, when executed by the processing system, cause the processing system to: receive, via a user interface of the user device, an indication to generate the non-email address usernames for the one or more service provider accounts.

Clause 49. The non-transitory computer-readable medium of any of clauses 43 to 48, further comprising computer-executable instructions that, when executed by the processing system, cause the processing system to: display, via a user interface of the user device, a list of the set of service providers; and receive, via the user interface of the user device, a selection of at least a subset of the set of service providers.

Clause 50. The non-transitory computer-readable medium of any of clauses 43 to 49, further comprising computer-executable instructions that, when executed by the processing system, cause the processing system to: display, via a user interface of the user device, links to change password pages of websites of at least the subset of the set of service providers.

Clause 51. The non-transitory computer-readable medium of clause 50, further comprising computer-executable instructions that, when executed by the processing system, cause the processing system to: transmit, via the change password pages of the websites of at least the subset of the set of service providers, change password requests to at least the subset of the set of service providers.

Clause 52. The non-transitory computer-readable medium of any of clauses 43 to 51, wherein the set of service providers from which the email account of the user has received one or more emails includes: all service providers identified in the email account of the user, or only service providers identified in the email account of the user and present in a database of service providers.

Clause 53. The non-transitory computer-readable medium of any of clauses 43 to 52, wherein the computer-executable instructions that, when executed by the processing system, cause the processing system to populate the password manager comprise computer-executable instructions that, when executed by the processing system, cause the processing system to: transmit, to a remote server, via a communication interface coupled to the processing system, the login information for the user for each of the set of service provider accounts; or store, in a local memory coupled to the processing system, the login information for the user for each of the set of service provider accounts.

Clause 54. The non-transitory computer-readable medium of any of clauses 43 to 53, further comprising computer-executable instructions that, when executed by the processing system, cause the processing system to: connect, via a communication interface coupled to the processing system, to one or more email servers hosting the email account of the user, wherein the email account of the user is scanned on the one or more email servers via the communication interface.

Clause 55. The non-transitory computer-readable medium of any of clauses 43 to 54, wherein the password manager is stored: in a memory of the user device, or in a memory of a remote server.

Clause 56. The non-transitory computer-readable medium of any of clauses 43 to 55, wherein the processing system is a component of: the user device, or a remote server.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., a user equipment (UE)). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. For example, the functions, steps and/or actions of the method claims in accordance with the aspects of the disclosure described herein need not be performed in any particular order. Further, no component, function, action, or instruction described or claimed herein should be construed as critical or essential unless explicitly described as such. Furthermore, as used herein, the terms "set," "group," and the like are intended to include one or more of the stated elements. Also, as used herein, the terms "has," "have," "having," "comprises," "comprising," "includes," "including," and the like does not preclude the presence of one or more additional elements (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of") or the alternatives are mutually exclusive (e.g., "one or more" should not be interpreted as "one and more"). Furthermore, although components, functions, actions, and instructions may be described or claimed in the singular, the plural is contemplated unless limitation to the singular is explicitly stated. Accordingly, as used herein, the articles "a," "an," "the," and "said" are intended to include one or more of the stated elements. Additionally, as used herein, the terms "at least one" and "one or more" encompass "one" component, function, action, or instruction performing or capable of performing a described or claimed functionality and also "two or more" components, functions, actions, or instructions performing or capable of performing a described or claimed functionality in combination.

What is claimed is:

1. An apparatus, comprising:
one or more memories;
one or more transceivers; and
one or more processors communicatively coupled to the one or more memories and the one or more transceivers, the one or more processors, either alone or in combination, configured to:
generate, based on a scan of an email account of a user of a user device, a list of a set of service providers from which the email account of the user has received one or more emails;
display, via a user interface of the user device, the list of the set of service providers;
receive, via the user interface of the user device, a selection of at least a subset of the set of service providers from the list of the set of service providers; and
create an entry in a password manager with login information for the user for each of a set of service provider accounts, wherein the set of service provider accounts corresponds to at least the subset of the set of service providers.

2. The apparatus of claim 1, wherein the one or more processors, either alone or in combination, are further configured to:
generate a password for one or more service provider accounts of the set of service provider accounts, wherein the login information for the user for the corresponding service provider account includes the password.

3. The apparatus of claim 1, wherein the one or more processors, either alone or in combination, are further configured to:
generate cloaked email addresses for one or more service provider accounts of the set of service provider accounts, wherein the login information for the user for the corresponding service provider accounts includes the cloaked email addresses.

4. The apparatus of claim 3, wherein the one or more processors, either alone or in combination, are further configured to:
receive, via a user interface of the user device, an indication to generate the cloaked email addresses for the one or more service provider accounts.

5. The apparatus of claim 1, wherein the one or more processors, either alone or in combination, are further configured to:
generate non-email address usernames for one or more service provider accounts of the set of service provider accounts, wherein the login information for the user for the corresponding service provider accounts includes the non-email address usernames.

6. The apparatus of claim 5, wherein the one or more processors, either alone or in combination, are further configured to:
receive, via a user interface of the user device, an indication to generate the non-email address usernames for the one or more service provider accounts.

7. The apparatus of claim 1, wherein:
the set of service provider accounts corresponds to the subset of the set of service providers, and
the list of the set of service providers is displayed, and the subset of the set of service providers is selected, before creation of the entry in the password manager for each of the set of service provider accounts.

8. The apparatus of claim 1, wherein the one or more processors, either alone or in combination, are further configured to:
display, via a user interface of the user device, links to change password pages of websites of at least the subset of the set of service providers.

9. The apparatus of claim 8, wherein the one or more processors, either alone or in combination, are further configured to:
transmit, via the change password pages of the websites of at least the subset of the set of service providers, change password requests to at least the subset of the set of service providers.

10. The apparatus of claim 1, wherein the set of service providers from which the email account of the user has received one or more emails includes:
all service providers identified in the email account of the user, or
only service providers identified in the email account of the user and present in a database of service providers.

11. The apparatus of claim 1, wherein the one or more processors configured to create the entry in the password manager comprises the one or more processors, either alone or in combination, configured to:
transmit, via the one or more transceivers, to a remote server, the login information for the user for each of the set of service provider accounts; or
store, in the one or more memories, the login information for the user for each of the set of service provider accounts.

12. The apparatus of claim 1, wherein the one or more processors, either alone or in combination, are further configured to:
connect, via the one or more transceivers, to one or more email servers hosting the email account of the user, wherein the email account of the user is scanned on the one or more email servers via the one or more transceivers.

13. The apparatus of claim 1, wherein the password manager is stored:
in a memory of the user device, or
in a memory of a remote server.

14. The apparatus of claim 1, wherein the apparatus is, or is a component of:
the user device, or
a remote server.

15. The apparatus of claim 1, wherein:
the set of service provider accounts corresponds to the set of service providers, and
the list of the set of service providers is displayed, and the subset of the set of service providers is selected, after creation of the entry in the password manager for each of the set of service provider accounts.

16. A method performed by a processing system, comprising:
   generating, based on a scan of an email account of a user of a user device, a list of a set of service providers from which the email account of the user has received one or more emails;
   displaying, via a user interface of the user device, the list of the set of service providers;
   receiving, via the user interface of the user device, a selection of at least a subset of the set of service providers from the list of the set of service providers; and
   creating an entry in a password manager with login information for the user for each of a set of service provider accounts, wherein the set of service provider accounts corresponds to at least the subset of the set of service providers.

17. The method of claim 16, further comprising:
   displaying, via a user interface of the user device, links to change password pages of websites of at least the subset of the set of service providers.

18. The method of claim 16, wherein creating the entry in the password manager comprises:
   transmitting, to a remote server, via a communication interface coupled to the processing system, the login information for the user for each of the set of service provider accounts; or
   storing, in a local memory coupled to the processing system, the login information for the user for each of the set of service provider accounts.

19. The method of claim 16, further comprising:
   connecting, via a communication interface coupled to the processing system, to one or more email servers hosting the email account of the user, wherein the email account of the user is scanned on the one or more email servers via the communication interface.

20. An apparatus, comprising:
   means for generating, based on a scan of an email account of a user of a user device, a list of a set of service providers from which the email account of the user has received one or more emails;
   means for displaying, via a user interface of the user device, the list of the set of service providers;
   means for receiving, via the user interface of the user device, a selection of at least a subset of the set of service providers from the list of the set of service providers; and
   means for creating an entry in a password manager with login information for the user for each of a set of service provider accounts, wherein the set of service provider accounts corresponds to at least the subset of the set of service providers.

* * * * *